(12) United States Patent
Birnkrant et al.

(10) Patent No.: US 9,822,264 B2
(45) Date of Patent: Nov. 21, 2017

(54) NANOCELLULAR AND NANOCELLULAR PARTICLE FILLED POLYMER COMPOSITE COATING FOR EROSION PROTECTION

(71) Applicant: United Technologies Corporation, Hartford, CT (US)

(72) Inventors: Michael J. Birnkrant, Kenilworth, NJ (US); Robert A. Barth, South Windsor, CT (US); Weina Li, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/898,743

(22) PCT Filed: Jul. 1, 2014

(86) PCT No.: PCT/US2014/045085
§ 371 (c)(1),
(2) Date: Dec. 15, 2015

(87) PCT Pub. No.: WO2015/009446
PCT Pub. Date: Jan. 22, 2015

(65) Prior Publication Data
US 2016/0137856 A1    May 19, 2016

Related U.S. Application Data

(60) Provisional application No. 61/846,488, filed on Jul. 15, 2013.

(51) Int. Cl.
C09D 7/12 (2006.01)
F01D 5/28 (2006.01)
F01D 25/00 (2006.01)
F04D 29/02 (2006.01)
F04D 29/32 (2006.01)
F04D 29/52 (2006.01)
C08K 7/24 (2006.01)
C09D 175/04 (2006.01)
C08K 3/08 (2006.01)

(52) U.S. Cl.
CPC .............. *C09D 7/1216* (2013.01); *C08K 7/24* (2013.01); *C09D 7/1283* (2013.01); *C09D 175/04* (2013.01); *F01D 5/288* (2013.01); *F01D 25/005* (2013.01); *F04D 29/023* (2013.01); *F04D 29/324* (2013.01); *F04D 29/522* (2013.01); *C08K 2003/0862* (2013.01); *C08K 2201/005* (2013.01); *F05D 2300/43* (2013.01); *F05D 2300/603* (2013.01); *F05D 2300/61* (2013.01); *F05D 2300/612* (2013.01)

(58) Field of Classification Search
CPC ................................. C09D 7/1216; C08K 7/24
USPC ......................................................... 523/218
See application file for complete search history.

(56) References Cited

U.S. PATENT DOCUMENTS

| | | |
|---|---|---|
| 6,025,034 A | 2/2000 | Strutt et al. |
| 2001/0014403 A1 | 8/2001 | Brown et al. |
| 2003/0042685 A1 | 3/2003 | Sanders et al. |
| 2009/0092842 A1 | 4/2009 | Hoover et al. |
| 2009/0148665 A1 | 6/2009 | Thiagarajan et al. |

OTHER PUBLICATIONS

International Search Report and Written Opinion dated Oct. 23, 2014, for corresponding PCT Application No. PCT/US2014/045085.
International Report on Patentability dated Jan. 28, 2016, for corresponding PCT Application No. PCT/US2014/045085.

*Primary Examiner* — Edward Cain
(74) *Attorney, Agent, or Firm* — Kinney & Lange, P.A.

(57) ABSTRACT

An article with an erosion protection layer. The erosion protection layer may include metal, intermetallic compound, ceramic or glass nanocellular foam particles or monolithic sheets. The particles are dispersed in a polymeric matrix and the monolithic sheets are infiltrated with polymeric material. The nanocellular foam ligaments have submicron cross-sectional diameters.

19 Claims, 2 Drawing Sheets

NANOCELLULAR AND NANOCELLULAR PARTICLE FILLED POLYMER COMPOSITE COATING FOR EROSION PROTECTION

BACKGROUND

The present invention relates generally to an aircraft and more particularly to erosion resistant engine coatings.

Erosion of exterior aircraft propulsion system components such as nacelles and fan inlet cases is an issue that has continued to be a source of problems for the industry. Of particular concern is erosion caused by sand, because sand typically contains a wide range of particle sizes. Sand may contain particles as small as 20-30 microns and as large as 1-2 millimeters. Fluids can also produce damaging results if impinged upon a substrate in a repetitive manner. A continuous impact of sand and fluids can lead to severe erosion, particularly on take off and landing in desert locations or in severe rain.

SUMMARY

An article includes an erosion protection layer attached to a surface of the article. The erosion protection layer may include metal, intermetallic compound, ceramic or glass nanocellular foam particles, or monolithic sheets. The nanocellular foam contains ligaments and nodes surrounded by pores and the ligaments have submicron cross-sectional diameters.

An embodiment includes nanocellular foam particles in a polymeric matrix.

A further embodiment includes nanocellular foam and polymeric material.

DETAILED DESCRIPTION

Figure 1:
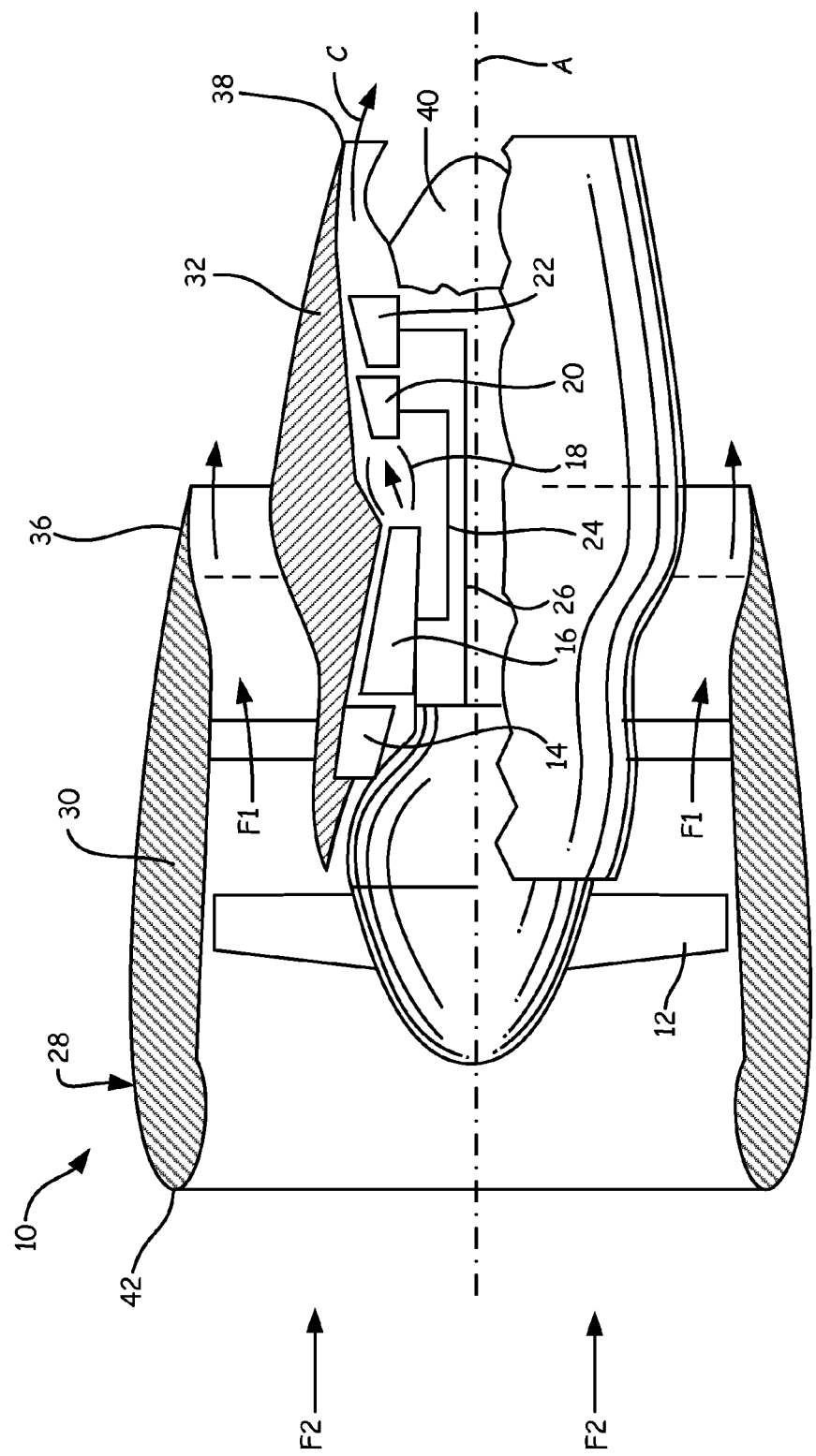
FIG. 1 is a schematic cross-section of a gas turbine engine.

FIG. 1 is a schematic cross section of gas turbine engine 10. Engine 10 includes fan assembly 12, low pressure compressor 14, high pressure compressor 16, combustor 18, high pressure turbine 20, and low pressure turbine 22. During operation, air is pressurized in compressors 14 and 16 and mixed with fuel and ignited in combustor 18 to generate hot combustion gases that flow through high and low pressure turbines 20 and 22 that extract energy from the hot gases. High pressure turbine 20 drives high pressure compressor 16 through high speed shaft 24. Low pressure turbine 22 drives fan assembly 12 and low pressure compressor 14 through low speed shaft 26.

Gas turbine engine 10 is in the form a high bypass ratio turbine engine mounted within nacelle assembly 28 in which most of the air pressurized by fan section 12 bypasses the core engine for generation of forward propulsion thrust. Nacelle assembly 28 includes fan cowl 30 and core cowl 32. Fan cowl 30 and core cowl 32 define the outer and inner surfaces of nacelle assembly 28.

Discharge airflow F1 is discharged from engine 10 through nozzle 36 defined radially between core cowl 32 and fan cowl 30. Core exhaust gases C are discharged from the core engine through nozzle 38 defined between core cowl 32 and center plug 40 disposed coaxially about center line axis A of gas turbine engine 10. Outer and inner surfaces of nacelle assembly 28 are continually exposed to abrasive content in airflow F2 entering engine 10 and in accelerated airflow F1 exhausting engine 10. Maximum abrasive degradation is expected at leading edge 42 of nacelle assembly 28 due to the direct impact of the abrading stream.

To minimize abrasive degradation, a lightweight improved abrasion resistant coating can be applied. For example, a composite abrasion resistant coating comprises nanocellular foam particles dispersed in a polymer matrix or polymer impregnated monolithic nanocellular foam in sheet form. The polymer may be a polyurethane or other compliant polymers known in the art. The nanocellular foam may be a metal, intermetallic compound, ceramic or glass nanocellular foam.

The disclosed erosion resistant coatings are intended to be utilized on any aircraft or engine surface exposed to high velocity solid or liquid particle impact.

Figure 2:
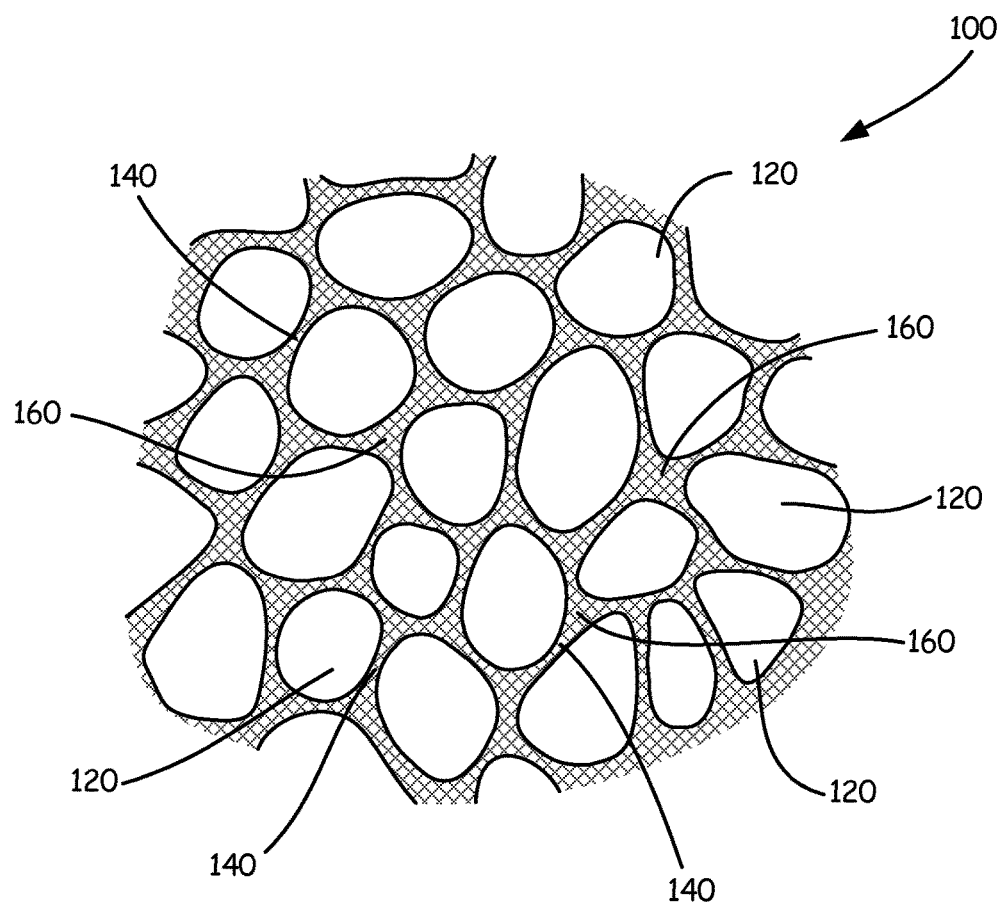
FIG. 2 is a schematic representation of foam.

A schematic illustration of a cellular foam is shown in FIG. 2. Foam 100 comprises ligaments 140 and nodes 160 surrounded by pores 120. Nodes 160 are defined by the junction of three or more ligaments. As the pore and ligament sizes of conventional metal and ceramic foams decrease, the foams exhibit relatively high strength to density ratios and strain tolerance. As an example, a nanocellular foam with 50 percent porosity can be produced with pore and ligament sizes in the range of 0.01 to 200 microns that are not visible to the naked eye and the material appears like a "dense" solid. As noted in application Ser. No. 13/570,954 entitled "NANOCELLULAR SEAL MATERIAL" by Beals et al. assigned to the assignee of this patent asset and incorporated herein by reference in entirety, the properties of nanocellular foams are attributed to the size dependence of the foam network, most notably the ligament diameter, d. The ligament strength, $\delta$, of a nanocellular foam ligament has been shown to follow an inverse power law relationship with the ligament diameter as follows:

$$\delta = Ad^{-n}$$

where A is a constant and the exponent n is from about 0.5 to 1.5. For n approaching 1.5, it is apparent that each 10× decrease in ligament diameter leads to a greater than 25× increase in strength and corresponding decrease in density. A rapid rise in strength and corresponding increase in mechanical compliance occurs when d is on the order of 10 microns or less for metal foams and 100 microns or less for ceramic foams.

The above disclosed foam integrated into a polymer such as polyurethane results in an engine component coating that is particularly effective against abrasions in a hard particle environment. The coating is effective against sand, dust, and rain erosion. For example, the disclosed coatings are suitable to protect at least the leading edges of gas turbine engine nacelles.

Nanocellular foam particles may be metal, intermetallic compounds, ceramic, glass or mixtures thereof in an open cell foam structure Metal nanocellular foams may be Ni, Mn, Ti, Cr, Al, W, V, Fe, Mo, Nb, Hf, Ta, Re, Ru, Ir, Pd, Pt, Y, Zr, and mixtures thereof. Ceramic nanocellular foams may be oxides, nitrides, and carbides of Ni, Mn, Ti, Cr, Al, W, V, Fe, Mo, Nb, Hf, Ta, Re, Ru, Ir, Pd, Pt, Y, Zr and mixtures thereof, SiC, silica and ceramic MAX phases. The porosity of the nanocellular foam may be from about 5 percent to about 95 percent. In addition, the nanocellular foams have sub micron ligament diameters.

Nanocellular foams exhibit improved erosion resistance because of their increased compliance under impact on the ligament structure of the foam. Additional benefits resulting from the addition of metallic or intermetallic compound nanocellular foam to an abrasion resistant coating are that the coating becomes electrically and thermally conductive. The coating may be used as an antenna as well as offering protection against lightning.

Three nanocellular foam examples were fabricated to demonstrate the efficiency of the disclosed embodiments.

In the first example, a nickel nanocellular foam was fabricated that had the following characteristics:
 Pore diameter: between 100 nm and 10,000 nm.
 Ligament diameter: between 10 nm and 1000 nm
 Density: 5 percent to 97 percent.

In the second example, a manganese nanocellular foam was fabricated with the following characteristics:
 Pore diameter: approximately 1000 nm.
 Ligament diameter: approximately 16 nm.
 Density: approximately 80 percent.

In the third example, a silicon carbide nanocellular foam was fabricated with the following characteristics:
 Pore diameter: approximately 700 nm.
 Ligament diameter: approximately 100 nm
 Density: approximately 95 percent.

A number of polymeric erosion resistant coatings are suitable carriers for the nanocellular foam particles of the invention. Examples include polyethers, polyurethanes, polycarbonates, epoxies, polyimides and siloxanes. Preferred polyethers are thermosetting polyurethanes, polyethers and siloxanes such as NuSil®.

While not being limited to any specific combination of nanocellular foam features, two configurations are noted for their impact erosion resistant qualities.

In the first configuration, nanocellular foam particles are suspended in a polymer carrier and applied to a surface by spraying, brushing, or by other means known in the art. The nanocellular foam particles in this case have particle sizes ranging from submicron diameters to over a millimeter in diameter. In the other configuration, an erosion resistant coating is a monolithic sheet of nanocellular foam impregnated with polymer and attached to a surface by adhesive, by mechanical means such as rivets, or thermal means such as brazing, soldering, or other means known in the art.

A preferred size of metal, intermetallic compound, ceramic or glass nanocellular foam particles is from 1 microns to 1000 microns. More preferably, from 10 microns to 1000 microns. A preferred volume percent of nanocellular foam filler in the abrasion resistant coatings of the invention is from 1 volume percent to 99 volume percent; and more preferably, 10 volume percent to 50 volume percent. The polymer filler and nanocellular foam particles can be mixed and poured into a mold containing the component to be coated or brushed or sprayed directly onto the component. One approach is to spray the component with the nanocellular foam particle filled mixture and then let the polymer cure to form the coating.

Alternatively, a size of nanocellular foam monolith or platelet is from 1 micron to 10 millimeters in thickness and greater than 1 cm in diameter. More specifically, from 10 microns to 1 millimeter in thickness and 5 cm in diameter. The platelets or monolith are laid up in a mold or on the component to be protected and the filler infiltrated into the mold or onto the substrate. A volume percent of nanocellular foam filler in the coatings is from 1 volume percent to 99 volume percent. More preferably, 10 volume percent to 50 volume percent.

The erosion resistance of the disclosed composite nanocellular foam particle filled polymer coatings of the invention was compared with standard metal powder filled polymer coatings in an in-house particulate erosion test rig under simulated test conditions experienced by engine nacelles.

More specifically, a coating according to the disclosed embodiments comprised 100 micron diameter nanocellular foam particles dispersed in a polyurethane matrix having a density of 1.17 gm/cc and a particle volume fraction of 20%.

The standard coating utilized in the test was a composite containing 100 micron diameter nickel particles dispersed in the same polyurethane matrix as the nickel nanocellular foam particle sample. The volume fraction of the nickel powder in the coating was 20 percent and the coating density was 1.84 gm/cc.

In the tests, a stream of 200-300 micron diameter particulate quartz silica erodent was directed at sample coatings and the weight loss of each sample was compared to the total amount of erodent impacting the samples in a standard calibrated area of the sample under velocities corresponding to actual flight conditions. Angles of incidence of 90 degrees and 20 degrees to the impacted sample surface were employed.

The erosion rates (ER) were measured in terms of grams lost per kg of erodent impacting the samples.

The results are summarized in the following table:

| Coating | Impact Angle to Sample Surface | Mass Erosion gm/kg | Volumetric Erosion cc/kg |
| --- | --- | --- | --- |
| 20 vol % 100 micron nanocellular Ni foam particles in polyurethane matrix | 90° | 1.36 | 1.17 |
| 20 vol % 100 micron Ni powder in polyurethane matrix | 90° | 10.09 | 5.50 |
| 20 vol % 100 micron nanocellular Ni foam particles in polyurethane matrix | 20° | 2.24 | 1.91 |
| 20 vol % 100 micron Ni powder in polyurethane matrix | 20° | 9.82 | 5.35 |

Under identical testing conditions of impact velocity and angle, the total mass erosion of the disclosed coating was only 12% of the standard coating under 90° impact and only 23% of the standard coating under 20° impact conditions. The total volumetric erosion of the disclosed coating was 21% of the standard coating under 90° impact and 36% under 20° impact. In addition the coating containing Ni nanocellular foam is 36% lighter.

The improved performance is presumed to be due to the unique mechanical properties of nanocellular foam. In a normal metal, intermetallic compound, ceramic or glass, the elastic compliance is small and impact from sand results in microcracks which leads to loss of material from the component. However, the same metal, intermetallic compound, ceramic or glass in a nanocellular foam form has at least an order of magnitude higher elastic compliance. The higher elastic compliance enables the foam to reversibly deform upon impact. A comparative metric of the ability of a material to absorb the impact of sand particles is the loss modulus. In mechanical studies using a micron sized indentor that applied nanoforces to the nanocellular foam demonstrated that the nanocellular foam had at least an order of magnitude higher loss modulus indicating the superior erosion resistant performance of this material.

Discussion of Possible Embodiments

The following are non-exclusive descriptions of alternative embodiments.

An article may comprise: an erosion protection layer affixed to a surface of said article, the erosion protection layer comprising an open cell nanocellular foam of a metal, intermetallic compound, ceramic, glass or mixtures thereof wherein the nanocellular foam comprises ligaments, and nodes surrounded by pores, and wherein the ligaments have submicron cross-sectional diameters.

The article of the preceding paragraph can optionally include, additionally and/or alternatively, any, one or more of the following features, configurations and/or additional components:

The erosion protection layer may include a polymeric matrix containing nanocellular foam particles with particle sizes from about 1 micron to over 1 mm The erosion protection layer may be a deposited layer applied to the surface.

The erosion protection layer may include a sheet of nanocellular foam infiltrated with a polymeric material.

The erosion protection layer may be attached by adhesive, mechanical fasteners, or by thermal bonding.

The particle sizes may be from about 1 micron to about 1 mm.

The metal may be selected from the group consisting Ni, Mn, Ti, Cr, Al, W, V, Fe, Mo, Nb, Hf, Ta, Re, Ru, Ir, Pd, Pt, Y, Zr, and mixtures thereof.

The ceramic may be selected from the group consisting of oxides, nitrides, and carbides of Ni, Mn, Ti, Cr, Al, W, V, Fe, Mo, Nb, Hf, Ta, Re, Ru, Ir, Pd, Pt, Y, Zr, and mixtures thereof, SiC, silica, and ceramic MAX phases.

The polymeric matrix may be selected from the group consisting of polyurethanes, polyethers, polycarbonates, epoxies, polyimides, siloxanes, and mixtures thereof.

The polymeric material may be selected from the group consisting of polyurethanes, polyethers, polycarbonates, epoxies, polyimides, siloxanes, and mixtures thereof.

The porosity of the foam may be from about 5 percent to about 95 percent.

A composite erosion resistant coating may comprise nanocellular foam particles in a polymeric matrix.

The composite coating of the preceding paragraph can optionally, include, additionally and/or alternatively any, one or more of the following features, configurations and/or additional components:

The nanocellular foam may be a metal, intermetallic compound, ceramic, glass or mixtures thereof.

The metal may be selected from the group consisting of Ni, Mn, Ti, Cr, Al, W, V, Fe, Mo, Nb, Hf, Ta, Re, Ru, Ir, Pd, Pt, Y, Zr, and mixtures thereof.

The ceramic may be selected from the group consisting of oxides, nitrides, and carbides of Ni, Mn, Ti, Cr, Al, W, V, Fe, Mo, Nb, Hf, Ta, Re, Ru, Ir, Pd, Pt, Y, Zr, and mixtures thereof, SiC, silica, and ceramic MAX phases.

The polymeric matrix may be selected from the group consisting of polyurethanes, polyethers, polycarbonates, epoxies, polyimides, siloxanes, and mixtures thereof.

The foam may be an open cell foam.

The porosity of the foam may be from about 5 percent to about 95 percent.

An erosion resistant coating composition may include: nanocellular foam and polymeric material.

The erosion resistant coating of the preceding paragraph can optionally include, additionally and/or alternatively any, one or more of the following features, configurations and/or additional components:

The nanocellular foam may be dispersed in the polymeric material in the form as particles.

The coating may be a nanocellular monolith infiltrated with polymeric material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within scope of the appended claims.

The invention claimed is:

1. An article comprising:
an erosion protection layer affixed to a surface of said article, the erosion protection layer comprising an open cell nanocellular foam of a metal, intermetallic compound, ceramic, glass or mixtures thereof wherein the nanocellular foam comprises ligaments, and nodes surrounded by pores, and wherein the ligaments have submicron cross-sectional diameters.

2. The article of claim 1 wherein the erosion protection layer comprises a polymeric matrix containing nanocellular foam particles with particle sizes from about 1 micron to over 1 mm.

3. The article of claim 2 wherein the erosion protection layer is a deposited layer applied to the surface.

4. The article of claim 2 wherein the polymeric matrix is selected from the group consisting of polyurethane, polyethers, polycarbonate, epoxy, polyimide, siloxane, and mixtures thereof.

5. The article of claim 1 wherein the erosion protection layer comprises a sheet of nanocellular foam infiltrated with a polymeric material.

6. The article of claim 5 wherein the erosion protection layer is attached by adhesive, mechanical fasteners or by thermal bonding.

7. The article of claim 5 wherein the polymeric material is selected from the group consisting of polyurethanes, polyethers, polycarbonates, epoxies polyimides, siloxanes, and mixtures thereof.

8. The article of claim 1 wherein the metal is selected from the group consisting of Ni, Mn, Ti, Cr, Al, W, V, Fe, Mo, Nb, Hf, Ta, Re, Ru, Ir, Pd, Pt, Y, Zr, and mixtures thereof.

9. The article of claim 1 wherein the ceramic is selected from the group consisting of oxides, nitrides and carbides of Ni, Mn, Ti, Cr, Al, W, V, Fe, Mo, Nb, Hf, Ta, Re, Ru, Ir, Pd, Pt, Y, Zr, and mixtures thereof, SiC, silica, and ceramic MAX phases.

10. The article of claim 1 wherein the porosity of the foam is from about 5 percent to about 95 percent.

11. A composite erosion resistant coating comprising nanocellular foam particles in a polymeric matrix, wherein the nanocellular foam is a metal, intermetallic compound, ceramic, glass or mixtures thereof.

12. The composite coating of claim 11 wherein the metal is selected from the group consisting of Ni, Mn, Ti, Cr, Al, W, V, Fe, Mo, Nb, Hf, Ta, Re, Ru, Ir, Pd, Pt, Y, Zr, Ti and mixtures thereof.

13. The composite coating of claim 11 wherein the ceramic is selected from the group consisting of oxides, nitrides, and carbides of Ni, Mn, Ti, Cr, Al, W, V, Fe, Mo, Nb, Hf, Ta, Re, Ru, Ir, Pd, Pt, Y, Zr, Ti and mixtures thereof.

14. The composite coating of claim 11 wherein the polymeric matrix is selected from the group consisting of polyurethanes, polyethers, polycarbonates, epoxies, polyimides, siloxanes, and mixtures thereof.

15. The composite coating of claim 11 wherein the foam is an open cell foam.

16. The composite coating of claim 11 wherein the porosity of the foam is from about 5 percent to about 95 percent.

17. An erosion resistant coating composition comprising nanocellular foam and polymeric material, wherein the nanocellular foam is a metal, intermetallic compound, ceramic, glass or mixtures thereof.

18. The erosion resistant coating of claim 17 wherein the nanocellular foam is dispersed in the polymeric material in the foam of particles.

19. The erosion resistant coating of claim 18 wherein the coating comprises a nanocellular foam monolith infiltrated with polymeric material.

* * * * *